United States Patent [19]

Crowder

[11] Patent Number: 4,893,395
[45] Date of Patent: Jan. 16, 1990

[54] U-JOINT PULLER

[76] Inventor: Glen R. Crowder, Rt. No. 1, Box 41, Wyandotte, Okla. 74370

[21] Appl. No.: 247,743

[22] Filed: Sep. 22, 1988

[51] Int. Cl.$^4$ .......................................... B23P 19/04
[52] U.S. Cl. .................................................. 29/259
[58] Field of Search ................................ 29/259–262

[56] References Cited

U.S. PATENT DOCUMENTS

| | | |
|---|---|---|
| 3,005,324 | 10/1961 | Zeller . |
| 3,076,259 | 2/1963 | Stebbins . |
| 3,568,294 | 3/1971 | Conner .................................. 29/259 |
| 3,846,891 | 11/1974 | Elg ........................................ 29/261 |
| 4,120,082 | 10/1978 | Bond . |
| 4,437,220 | 3/1984 | Gregory . |
| 4,463,489 | 8/1984 | James . |
| 4,510,661 | 4/1985 | Campa . |
| 4,570,319 | 2/1986 | Skoworodko . |
| 4,646,412 | 3/1987 | Eade . |

FOREIGN PATENT DOCUMENTS 1093747 11/1960 Fed. Rep. of Germany ........ 29/261
247479 2/1926 United Kingdom .................. 29/261

Primary Examiner—Robert C. Watson
Attorney, Agent, or Firm—Head & Johnson

[57] ABSTRACT

This is an apparatus for pulling the bearing cup of a universal joint. It includes a first and a second leg which in operation are each bolted at one end to the yoke arm of a first yoke assembly. The cross bar of a Tee-puller is inserted through rectangular openings in the ends of the legs opposite the end bolted to the yoke arm. Standoff bolts secure a drive bar to one of the yoke arms of a second yoke assembly having the bearing cup which is to be removed. A pusher bolt of the Tee-puller is positioned to contact the drive bar held by the two standoff bolts.

1 Claim, 4 Drawing Sheets

U-JOINT PULLER

BACKGROUND OF THE INVENTION

1. Field of the Invention

This invention pertains to the field of universal joint disassembly tools and more particularly to an apparatus for disassembling a universal joint so that new bearings assemblies may be inserted into the universal joint when it is reassembled.

2. Description of the Prior Art

Universal joints are widely used, especially in the driving of motor vehicles. They are used to connect a first drive shaft to a second drive shaft. Each shaft is connected to a yoke assembly having a pair of parallel configurated arms which are positioned adjacent opposite ends of a journal assembly (cross member) of the universal joint. The bearing assembly of the universal joint usually includes a bearing cup having an integrally formed mounting flange. The bearing cups with bearing is pressure fitted into the hole of each yoke arm in the space between the yoke arm and an extension of the cross member of the universal joint. After long periods of use, these bearings become worn and must be replaced. The bearing cup assembly including the bearing cup in the bearings must be pulled and replaced by a cup having new bearings. The bearings may be sealed with proper lubricant or there may be fittings for applying lubricant after a period of operation.

OBJECTS OF THE INVENTION

It is an object of the present invention to provide a novel apparatus for disassembling a universal joint. It is a further object of this invention to provide an apparatus which can be used in combination with a commercially available Tee-Puller.

It is a still futher object of this invention to provide an inexpensive apparatus for removing bearing cup for universal joints wherein one such apparatus can be used for several different size universal joints.

SUMMARY OF THE INVENTION

This is apparatus for disassembling a universal joint and includes two essentially identical elongated legs, each having a rectangular opening near one end, and a drive bar with two stand-off bolts all used in conjunction with a Teepuller. The stand-off bolts attach the drive bar to the yoke arm at which it is desired to remove the bearing cup.

The T puller typically has a cross bar with a pusher bolt threadedly extending therethrough in a perpendicular relation.

The operation, when it is desired to remove a bearing cup from a universal joint, the ends of the two legs opposite the rectangular openings are attached to the two arms of the opposing yoke assembly. These stand-off bolts are screwed into existing holes in the yoke arm from which it is desired to remove the bearing cup. Next, the ends of the cross bar of the T puller is inserted through the rectangular openings in the two legs. The pusher bolt is tightened against the drive bar which drives the yoke arm down and the bearing cup is then exposed and removed from within the yoke arm.

DETAILED DESCRIPTION

Figure 1:
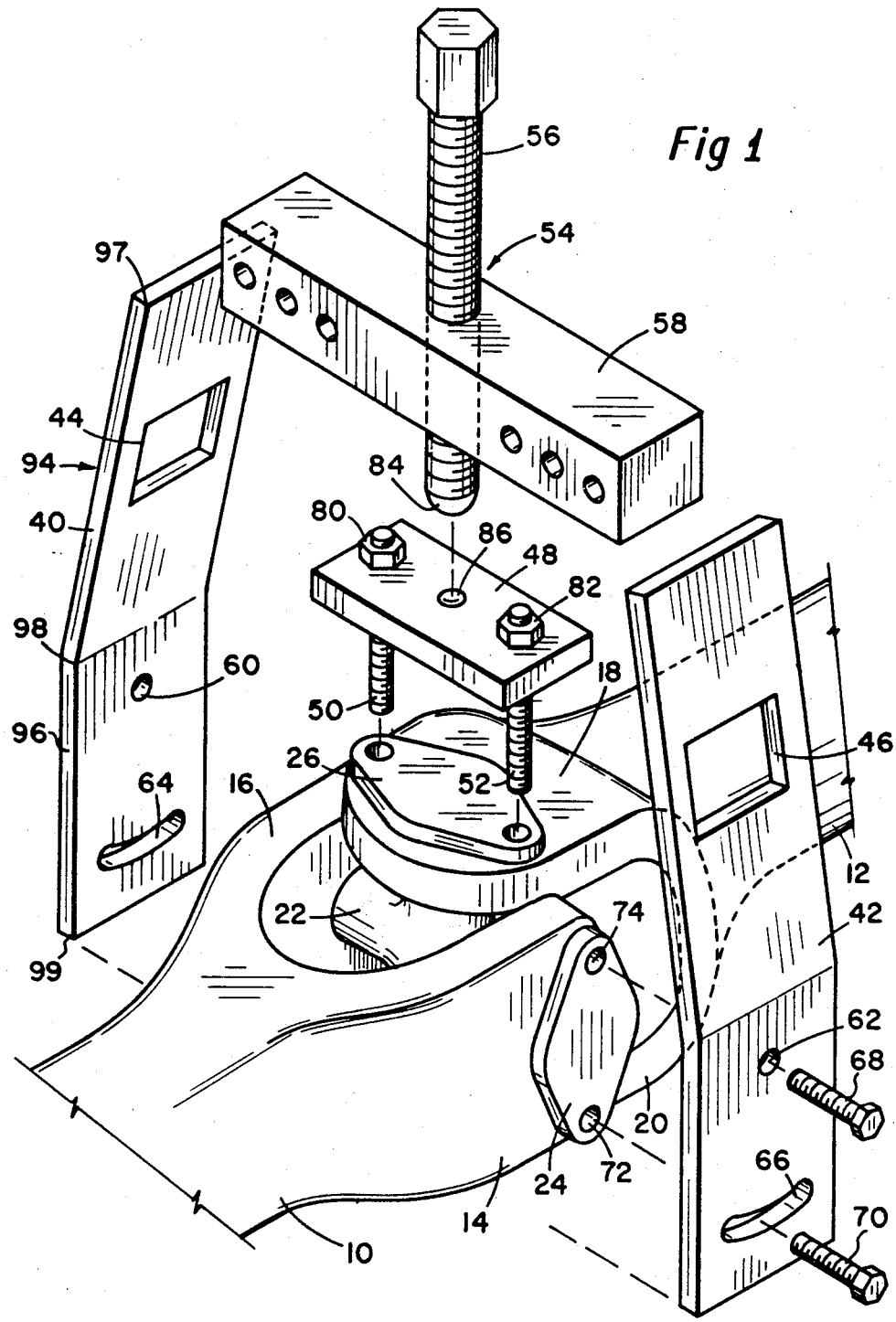
FIG. 1 is a partly exploded view showing the present invention in relation to a universal joint.

Attention is first directed to FIG. 1 which shows a universal joint connecting shaft 10 to shaft 12. A first yoke assembly having yoke arm 14 and 16 is connected to shaft 10 and a second yoke assembly having yoke arms 18 and 20 connected to shaft 12. A cross member 22 is provided with these two sets of yoke arms and together with associated parts form a typical, conventional universal joint such as used on diesel trucks. These associated parts include bearing flange assemblies 24 and 26 on yoke arms 14 and 18, respectively. As indicated in FIG. 2, yoke arm 18, and each of the other yoke arms, have a threaded hole 28 and 30 on opposite sides of a hole 32.

Figure 2:
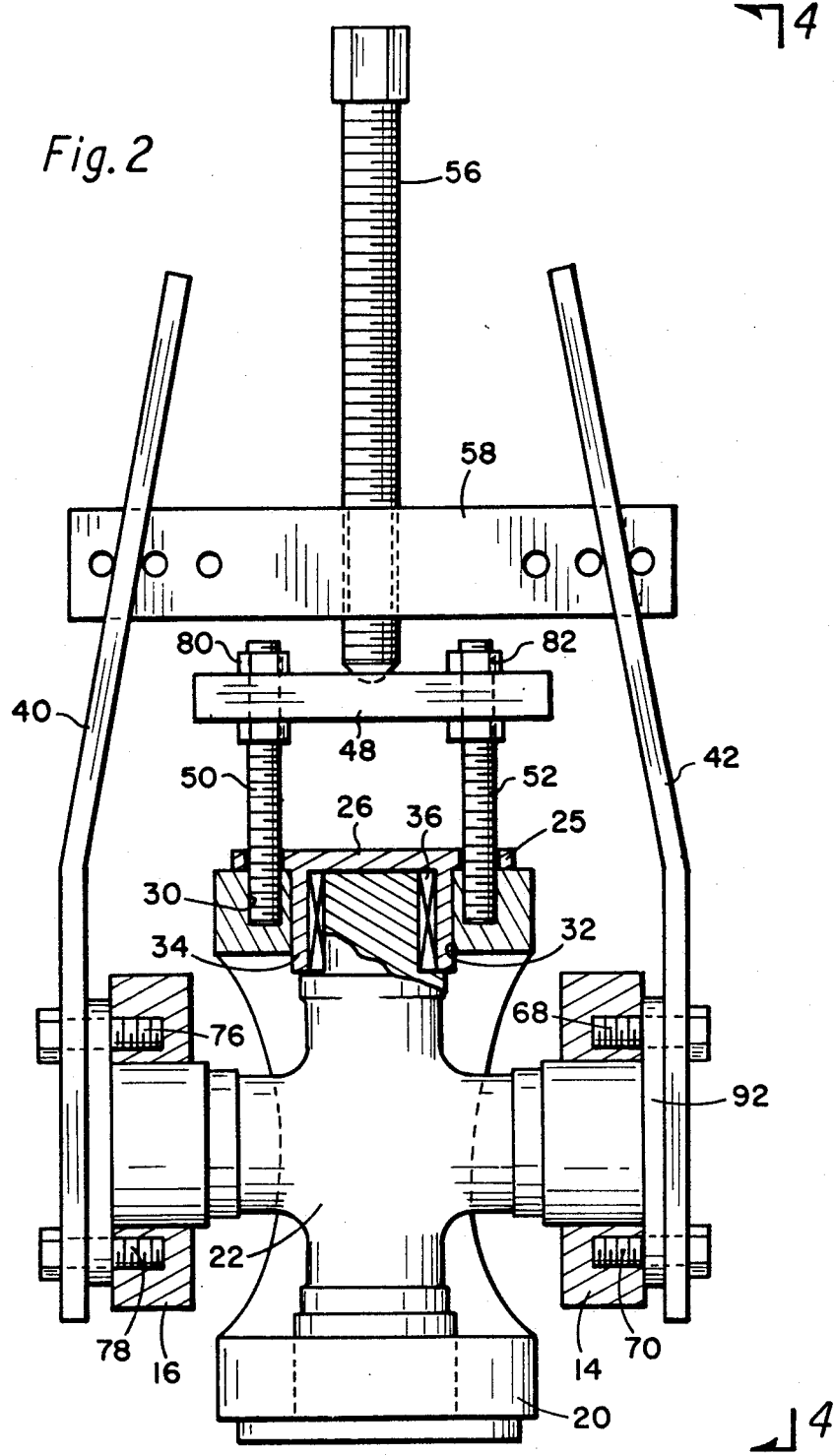
FIG. 2 is a sectional view partly broken away, illustrating my cup bearing removal tool which is positioned on a universal joint.

Referring back to FIG. 1 there is shown the apparatus of my invention which is useful for removing the bearing flange assembly 26 which includes cup 24, flange 25 and bearings 36, as shown in FIG. 2. This removal assembly or tool includes a first leg 40 and a second leg 42. There is shown a drive bar 48 with stand-off bolts 50 and 52. Also shown is a Tee-puller 54 which includes a pusher bolt 56 threadedly extending through cross bar 58.

Leg 40 and leg 42 each has a rectangular opening 44 and 46 in the upper end thereof. The lower end of first leg 40 and second leg 42 is provided, respectively, with a first hole 60 and a second hole 62, respectively, and preferably curved arcuate slot 64 and 66, respectively. Bolts 68 and 70 extends through holes 62 and slot 66, respectively, and through holes 74 and 72 of the bearing flange assembly of yoke 14 into threaded holes within yoke arm 14. Thus the legs are easily secured to the first yoke assembly of yoke arms 14 and 16.

Attention is now directed especially to FIG. 2 which shows the exploded assembly of FIG. 1 in operating position for removing the bearing cup 34. As shown thereon the lower ends of the arms 40 and 42 are connected to yoke 14 and 16, respectively, by bolts 76 and 78 and by bolts 68 and 70, respectively. The curved slots 64 and 66 permit the ease of alignment. During the assembly process of legs 40 and 42 to yoke arms 14 and 16, cross bar 58 is inserted through openings 44 and 46 of the top of the legs. Stand-off bolts 50 and 52 are assembled through non-threaded holes in drive bar 48 and are secured there by nuts 80 and 82, respectively. The lower end of bolts 50 and 52 are threaded into threaded holes 30 and 28 in yoke arm 18. The tip 84 of the lower end of pusher bolt 56 is tightened into recess 86 of drive bar 48.

Figure 3:
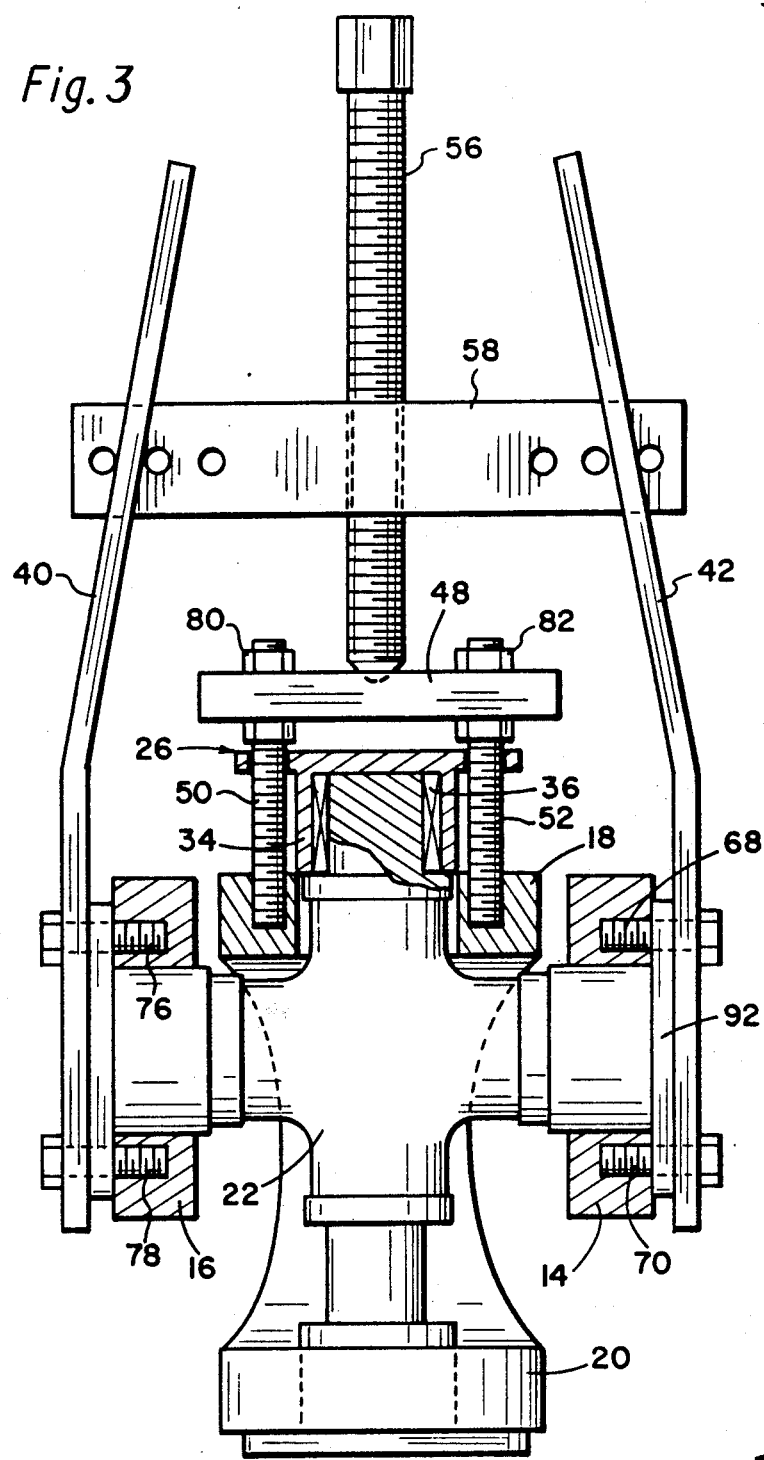
FIG. 3 is similar to FIG. 2 except that in this view the bearing cup is shown as having been removed.

Referring now especially to FIG. 3, movement of the pusher bolt 58 causes the drive bar 48 to push down on stand-off bolts 50 and 52. The standoff bolts 50 and 52 then force the yoke arms 18 and 20 downwardly to the position shown in FIG. 3. Flange 26, cup 34, and the interior bearings 36 have thus been forced out of the arm 18. This bearing assembly can now be easily removed. My bearing removal device is then removed from its position with respect to the yoke arm 18 and then positioned to remove another cup assembly as may be required such as yoke assembly 92. When the bearing assemblies from yokes 18 and 20 are removed, then the yoke arms 18 and 20 can be removed from the universal joint.

A typical leg is about one foot long and 1½ inches in width and ¼ inch thick and may be made out of a strong metal such as steel. Typically, the hole 44 is rectangular in shape and is about 1¼ inches wide by 1⅜ inches high. By height it is meant the distance along the long length of the leg. Typically, hole 60 would be 7/16 inches and would be centered across the narrow dimension of the leg. It is noted that the leg is bent and that the upper portion 94 is typically about 7¼ inches long and the lower portion 96 is about 4¾ inches long. The drive bar 48 is typically ⅜ inch thick, two inches wide and 3 ⅞ inches long. If one would draw a straight line from point 97 to point 99 the point 98 (at the junction of sections 94 and 96) would preferably be about ½ inch. These dimensions are typical and are not intended to limit the invention.

Figure 5:
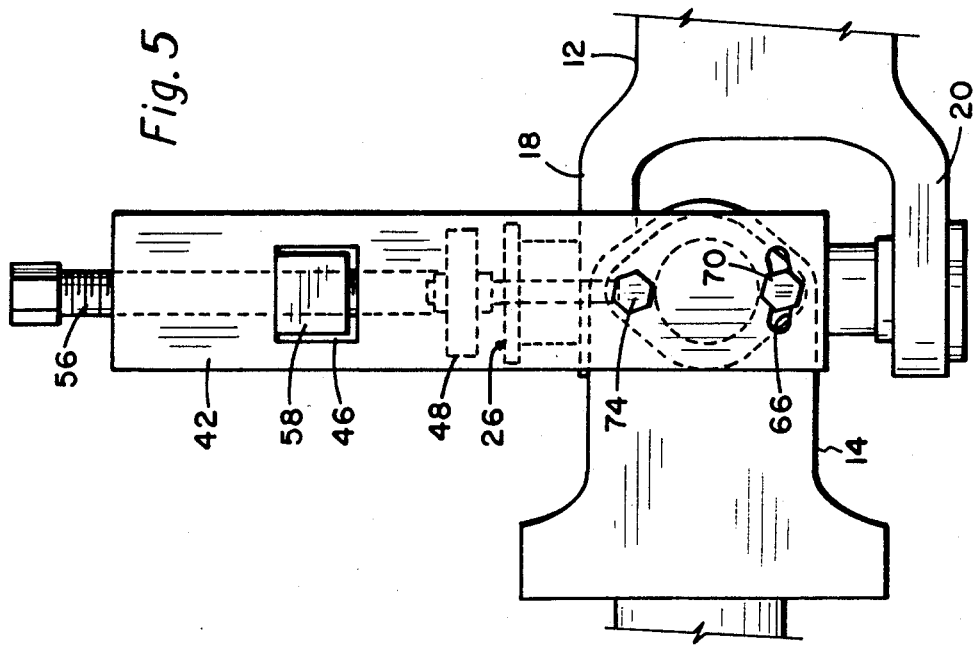
FIG. 5 is a view taken along the line 5—5 of FIG. 3.
Figure 4:
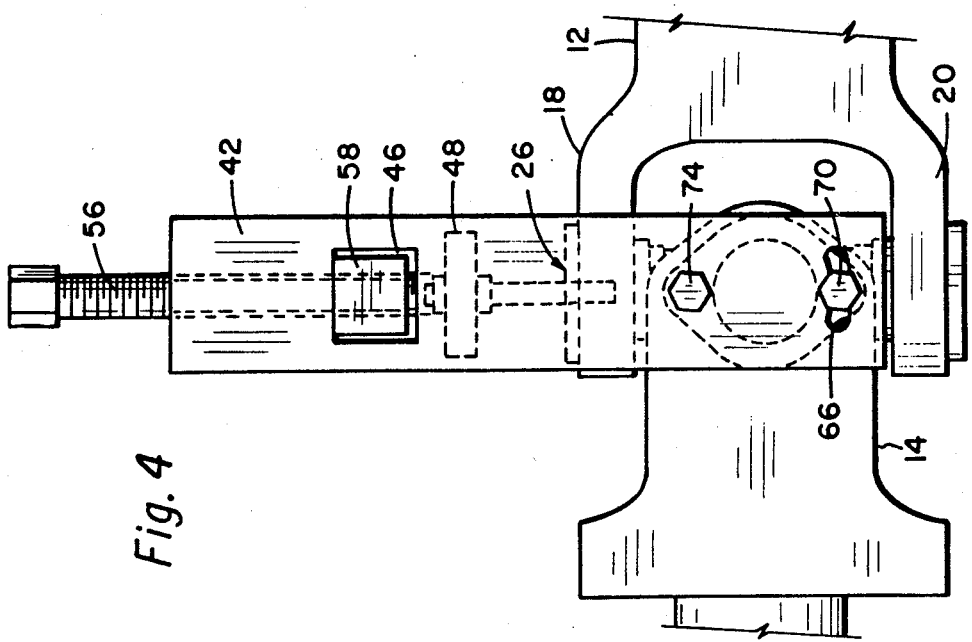
FIG. 4 is a view taken along the line 4—4 of FIG. 2.

FIG. 4 is an end view of FIG. 2 and shows the bearing flange assembly 26 still in operating position. FIG. 5 is an end view of FIG. 3 and shows that the bearing flange assembly 26 has been completely removed from the yoke arm 18.

My invention can be used for various size universal joints. This is because the legs 40 and 42 are not fixed together. The upper end of legs 40 and 42 are bent so that it can be assembled as shown in FIG. 2, and the cross bar 58 of the Tee-puller can fit into the hole 46 and 44 for wider or narrower distances between yokes 14 and 16 for example. Another advantages of my invention is that the cost to manufacture is much smaller than that of prior universal joint pullers. For example, it is estimated that the cost of my device will be less than about one-third or one-half of the other devices.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What I claim is:

1. An apparatus for removing a bearing cup normally held by a pair of bolts from a universal joint of the type having a first yoke member and a second yoke member, and each said yoke having opposed arms, each said arm having a bearing cup mounted therein, comprising:

a Tee-puller having a pusher bolt and a cross bar;

first and second legs, each said leg having a hole toward one end through which said cross bar may extend, each said leg being an elongated flat member having a first upper section and a second bottom section in which said first section is bent inwardly with respect to the second section, and having a pair of first and second vertically spaced bolt holes on said second section, said bolt holes being spaced apart a distance equal to the centerline distance of said pair of bolts holding said bearing cup, at least one of said bolt holes being in the form of an arcuate slot, and means to attach said first and second legs, via said first and second bolt holes, to a pair of said bearing cups of said first yoke for removal of a bearing cup that is transverse thereto in one of said arms of said second yoke.

* * * * *